United States Patent
Ander et al.

(10) Patent No.: US 9,852,656 B2
(45) Date of Patent: Dec. 26, 2017

(54) ALARM MONITORING SYSTEM

(71) Applicants: Barbara Ander, Fort Worth, TX (US); Sidney Ander, Fort Worth, TX (US); Alexis Kashar, Scarsdale, NY (US)

(72) Inventors: Barbara Ander, Fort Worth, TX (US); Sidney Ander, Fort Worth, TX (US); Alexis Kashar, Scarsdale, NY (US)

( * ) Notice: Subject to any disclaimer, the term of this patent is extended or adjusted under 35 U.S.C. 154(b) by 75 days.

(21) Appl. No.: 14/153,411

(22) Filed: Jan. 13, 2014

(65) Prior Publication Data

US 2015/0199919 A1      Jul. 16, 2015

(51) Int. Cl.
| | |
|---|---|
| *G09B 21/00* | (2006.01) |
| *G08B 5/36* | (2006.01) |
| *G08B 6/00* | (2006.01) |
| *G08B 7/00* | (2006.01) |
| *G08B 17/00* | (2006.01) |

(52) U.S. Cl.
CPC ............ *G09B 21/009* (2013.01); *G08B 5/36* (2013.01); *G08B 6/00* (2013.01); *G08B 7/00* (2013.01); *G08B 17/00* (2013.01)

(58) Field of Classification Search
CPC . G08B 6/00; G08B 7/06; G08B 7/066; G08B 17/00; G08B 17/10; G08B 21/009; G08B 21/22; G08B 21/0423; G08B 21/0446; G08B 21/0453; G08B 21/0461; G08B 21/0469
See application file for complete search history.

(56) References Cited

U.S. PATENT DOCUMENTS

| | | | |
|---|---|---|---|
| 4,365,238 A | 12/1982 | Kollin | |
| 4,853,674 A * | 8/1989 | Kiss | G09B 21/009 340/407.1 |
| 5,251,253 A * | 10/1993 | Chutuk | H04M 11/04 379/102.03 |
| 5,651,070 A | 7/1997 | Blunt | |
| 5,809,112 A * | 9/1998 | Ryan | H04M 11/066 379/52 |
| 5,867,105 A * | 2/1999 | Hajel | G08B 6/00 340/407.1 |
| 5,917,420 A | 6/1999 | Gonzalez | |
| 6,288,642 B1 | 9/2001 | Dohrmann | |
| 6,381,472 B1 * | 4/2002 | LaMedica, Jr. | H04W 76/02 379/52 |

(Continued)

FOREIGN PATENT DOCUMENTS

KR      WO 0070779 A1 *    11/2000    ............. H04B 1/207

OTHER PUBLICATIONS

Greg Livadas; "Waking up may soon be a lot easier for deaf and hard-of-hearing individuals RIT/NTID students win $5,000 in 'The Next Big Id' innovation competition";http://www.rit.edu/news/story.php?id=50770#.U207Cd_fK9A.facebook; May 9, 2014; 2 pages.

(Continued)

*Primary Examiner* — John A. Tweel, Jr.
*Assistant Examiner* — Adnan Aziz
(74) *Attorney, Agent, or Firm* — James E. Walton

(57) ABSTRACT

The alarm monitoring system provides various alerts of events that are not readily discernable to those with hearing difficulties. The system generates visual, vibratory, and high decibel alerts separately or in combination to alert the user to a wide variety of events for those with multisensory impairments.

12 Claims, 5 Drawing Sheets

(56) References Cited

U.S. PATENT DOCUMENTS

| | | | | |
|---|---|---|---|---|
| 6,384,724 B1* | 5/2002 | Landais | | G08B 6/00 340/331 |
| 6,624,750 B1* | 9/2003 | Marman | | G08B 25/003 340/4.3 |
| 6,831,974 B1* | 12/2004 | Watson | | H04M 3/42391 379/142.04 |
| 6,867,688 B2 | 3/2005 | Lamb | | |
| 6,950,019 B2* | 9/2005 | Bellone | | G08B 6/00 340/407.1 |
| 7,015,807 B2 | 3/2006 | Roby et al. | | |
| 7,042,338 B1* | 5/2006 | Weber | | G08B 5/223 340/309.16 |
| 7,129,833 B2 | 10/2006 | Albert | | |
| 7,148,797 B2 | 12/2006 | Albert | | |
| 7,170,397 B2* | 1/2007 | Roby | | G08B 7/06 340/384.1 |
| 7,173,881 B1* | 2/2007 | Freudenberg, Jr. | | G04F 10/00 340/540 |
| 7,227,463 B2 | 6/2007 | Merrell | | |
| 8,203,444 B2* | 6/2012 | Strohallen | | G08B 25/10 340/4.12 |
| 8,780,201 B1* | 7/2014 | Scalisi | | H04N 7/186 348/143 |
| 8,917,821 B2* | 12/2014 | Engelke | | G10L 15/265 379/52 |
| 2003/0067882 A1* | 4/2003 | Leung | | H04J 3/175 370/252 |
| 2006/0226973 A1 | 10/2006 | Catlin | | |
| 2006/0234193 A1* | 10/2006 | Sahashi | | H04M 3/567 434/112 |
| 2006/0276218 A1* | 12/2006 | Goris | | H04M 1/72591 455/550.1 |
| 2006/0285652 A1* | 12/2006 | McClelland | | H04M 3/42391 379/52 |
| 2007/0001825 A1* | 1/2007 | Roby | | G08B 7/06 340/407.1 |
| 2007/0216537 A1 | 9/2007 | Park | | |
| 2007/0229257 A1* | 10/2007 | Bliding | | E05B 49/00 340/566 |
| 2008/0012716 A1* | 1/2008 | Saltzstein | | G08B 1/08 340/600 |
| 2008/0111677 A1* | 5/2008 | Kolz | | G08B 1/08 340/539.11 |
| 2008/0143517 A1* | 6/2008 | Goffin | | H04L 12/2827 340/540 |
| 2008/0267361 A1* | 10/2008 | Dileo | | H04M 11/085 379/52 |
| 2010/0060466 A1* | 3/2010 | Austin | | G08B 6/00 340/628 |
| 2010/0087138 A1* | 4/2010 | Hedstrom | | H04H 20/61 455/3.01 |
| 2012/0280790 A1* | 11/2012 | Gerhardt | | G07C 9/00309 340/5.61 |
| 2013/0281169 A1* | 10/2013 | Coverstone | | H04M 19/048 455/575.8 |
| 2014/0064528 A1* | 3/2014 | Flood | | H04R 25/554 381/315 |
| 2014/0197946 A1* | 7/2014 | Park | | G08B 21/18 340/539.11 |

OTHER PUBLICATIONS

Greg Livadas; "Sonic-connect™ USB Media Alert—on Sale Now"; http://www.chs.ca/products/sonic-connecttm-usb-media-alert; Apr. 29, 2014; 2 pages.

Ethan, Seth, and Jeff; "Baboomi: A Customizable and Comfortable Alarm";https://www.kickstarter.com/projects/215279222/baboomi-a-customizable-and-comfortable-alarm?ref=live; Sep. 27, 2013; 18 pages.

* cited by examiner

ALARM MONITORING SYSTEM

BACKGROUND

1. Field of the Invention

The present invention relates in general to the field of devices supporting those with hearing difficulties to monitor and relay information not readily discernable to those that are deaf and/or hard of hearing. Those users with hearing difficulties maybe completely deaf or partial deaf and would benefit from an alarm system to provide alerts.

2. Description of Related Art

There are many designs of systems for alerting those with hearing impairments, including those that are deaf or hard of hearing and those individuals with multisensory needs, to conditions that they would normally not be aware of. Some systems are very limited such as those that merely add a flasher to the doorbell. Other systems require the user to replace existing hardware for the system to function properly. While there are many systems for alerting those with hearing impairments well known in the art, considerable room for improvement remains.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
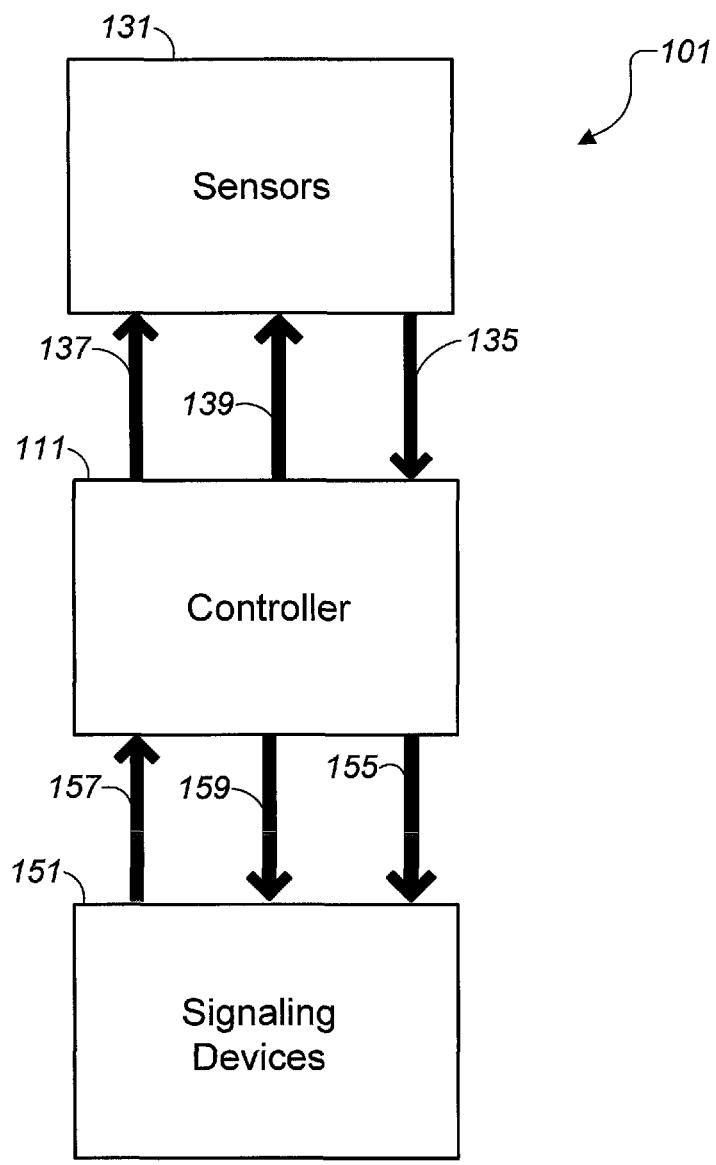
FIG. 1 is a schematic of the preferred embodiment of an apparatus for alarm monitoring according to the present application.

While the assembly of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the apparatus for alarm monitoring are provided below. It will of course be appreciated that in the development of any actual embodiment, numerous implementation-specific decisions will be made to achieve the developer's specific goals, such as compliance with assembly-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring to FIG. 1 in the drawings, a preferred embodiment of an apparatus for alarm monitoring 101 according to the present application is illustrated. The alarm monitoring system 101 is comprised of a controller 111, sensors 131, and signaling devices 151. Controller 111 monitors sensors 131 for certain conditions and then generates output to signaling devices 151.

In the preferred embodiment sensors 131 provide conditional information 135 related to the conditions of the sensors 131 to the controller 111. Typically this conditional information could be a varying voltage, current, impedance, resistance, and/or, digital signal that allows the controller 111 to recognize the conditions of the sensors 131. Additionally the controller typically provides power 137 and information 139 to the sensors 131. While it is shown that the sensors 131 are provided power 137, it should be apparent that sensors 131 could have their own power supplies. The communications lines to and from the controller 111 and sensors 131 are preferably wireless such as radio controlled, Pulse Coded Modulated over radio frequency, Bluetooth, or Wifi. Because users of the system have hearing impairments the typical sensor is an acoustic sensor tuned for a specific frequency range. The sensor may be tuned to pick up a knock, a shout, a cry, an alarm, or other environmental noises. The sensors may be tuned to pick up very specific ranges of frequencies that indicate a very specific alarm such as the output of a permanent door bell, a temporary doorbell, carbon monoxide alarm, general environmental noise, the sound of running water, children screaming, a weather radio, a fire alarm, a security alarm, and/or some other device that emits sound to alert users to changed conditions. The controller 111 can monitor the variety of sensors concurrently. For example it can sense if a fire alarm and if a water alarm was sounding at the same time. Those sensors with batteries are able to provide the controller 111 with status of the batteries such that if the sensor cannot likely communicate in the near future because the battery level is approaching such a diminished level to prevent further communications, the controller 111 indicates to the user that a particular sensor has a low battery. The user then can change the battery and see that controller 111 does not indicate a low battery in that particular sensor. In some instances the sensors are hard wired from the controller 111 to the sensors 131.

In the preferred embodiment the signaling devices 151 provide a variety of alerts to users. The alerts could be the conditions of the sensors 131 or timers. Typically, the alerts would take the form of flashing lights, audible alarms, vibrations, or a combination of all these types of signals. Signaling devices 151 are typically wired 155 to the controller due to the critical nature of the alerts however it should be apparent that the signaling devices 151 could be wirelessly interfaced with the controller 111 through such channels such as radio controlled, Pulse Coded Modulated over radio frequency, Bluetooth, or Wifi. In an alternative embodiment the controller 111 can be integrated into a larger system where the controller sends and receives information via the global internet and by data transmissions over cellular networks, both cellular data networks and cellular voice networks along with cellular text messaging networks. In order to increase the reliability of the system 101 the signaling devices 151 provide feedback 157 to the controller 111. The feedback for example would be separate confirmation that the lights were illuminated by a light measuring sensor. Or the feedback 157 might be an imbedded microphone in the speaker that listens for the audible alert. Typically the signaling devices 151 would be powered by the controller 111 but in alternative embodiments the signaling devices 151 could have redundant power systems such as wired power 159 from the controller 111 and a battery pack or alternative power supply. Those signaling devices with batteries are able to provide the controller 111 with status of the batteries such that if the signaling devices 151 cannot likely communicate in the near future because the battery level is approaching such a diminished level to prevent further communications, the controller 111 indicates to the user that a particular signaling device has a low battery. The user then can change the battery and see that controller 111 does not indicate a low battery in that particular signaling device.

Figure 2:
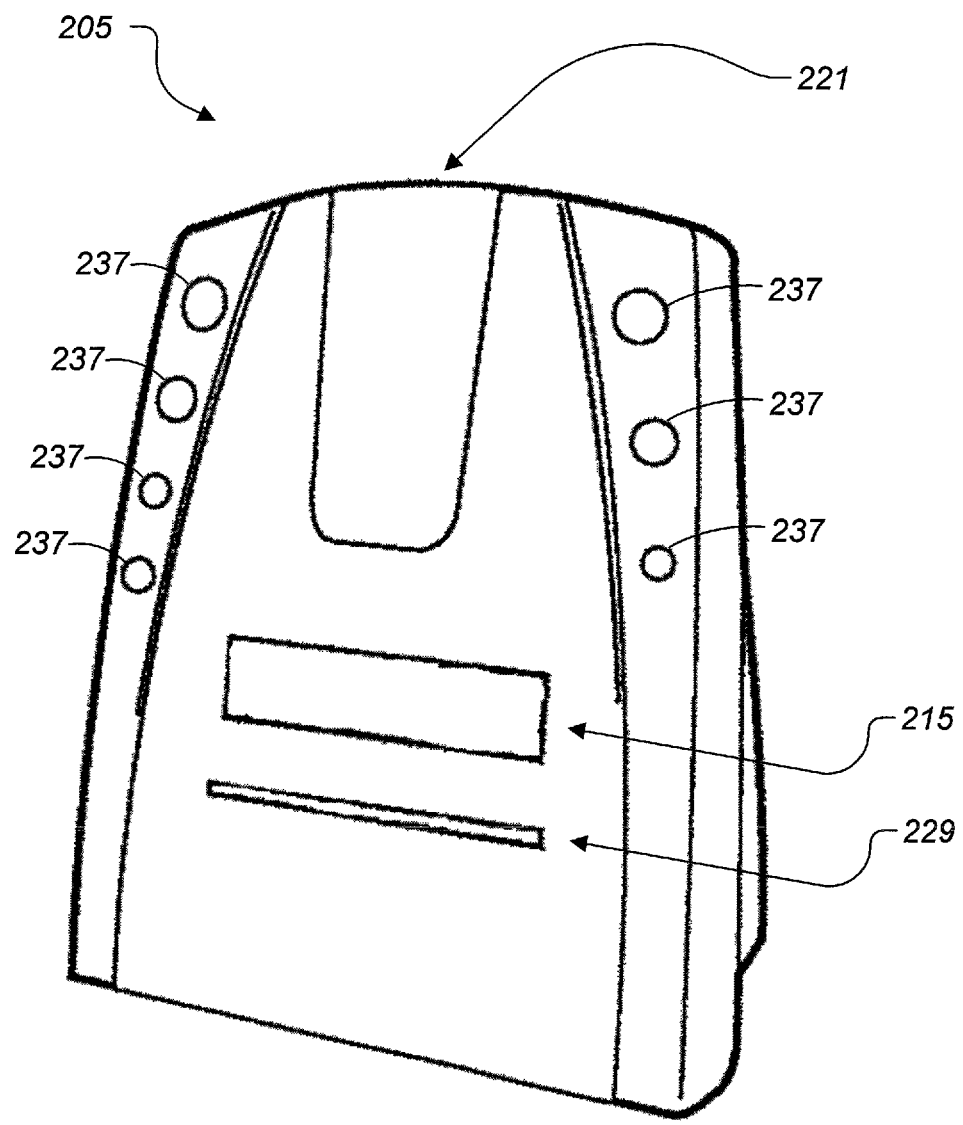
FIG. 2 is a perspective view of a preferred embodiment of a controller according to the present application.

Referring now also to FIG. 2 in the drawings, a preferred embodiment of a controller 205 according to the present application is illustrated. Controller 205 has a display 215, a light 221, illuminators 229, input devices 237, a bed shaker, a radio, an alarm clock, and a speaker. The user of controller 205 would typically locate the controller 205 where ever the user typically is. For example controller 205 would normally be located on a bed side table to indicate to the user the conditions in other rooms. Typically, the bed shaker connects to the controller 205 by a 3.5 mm male pin located on the bed shaker side of the electrical coupling. Because the controller 205 provides power to the shaker by the wired connection, the controller side of the electrical coupling is a female port the wiring from the bed shaker plugs into. Having the female port on the controller 205 decreases the chance of electrical injury to the user.

Display 215 displays messages to the user related to the conditions of the sensors. For example if the sensor that registers someone was at the door indicated that the there was movement at the door, the display 215 would indicate the word "DOOR" across the display 215 to allow the user to know that there was likely someone at the door. Alternatively, the display 215 would display "TELE" to indicate that the phone was ringing. In the preferred embodiment the display is an array of light emitting diodes "LED", however it should be apparent that the display 215 could be made of liquid crystal or similar technology that allows the controller 205 to provide messages to the user. Alternative embodiments of display 215 indicate illustrations to the user of the alarm. For example, if the fire alarm was sounding, the display would show an image of a fire. Furthermore, the user is able to add a background image to the display tied to the position of the sensor that is added to the display. Therefore the image of the fire is overlaid the user's image of the room with the sensor in it. This provides the user a quick way to determine where the fire is located. Illuminators 229 are typically a row of LED's to alert the user to the conditions of the sensors, controller 205, and signaling devices. While LED's are the preferred indicator it should be apparent that other devices such as light bulbs could be used to indicate the conditions of the system. In case the distance between the sensor and the controller 205 is so great that controller 205 is unable to communicate with the sensor, a repeater is used to relay information between the sensor and the controller 205 over great distances. In order that multiple controllers can be located in close proximity, such as a hotel, each controller is paired with each sensor such that only paired sensors can indicate alarms to the controller. Located in controller 205 is a set of dip switches (Not shown). Located in the various input devices 237 are similar dip switches. User configures the sets of dip switches in both items to pair the input device 237 to the controller 205. Paring is accomplished by matching the dip switches in the controller 205 to that in the input device 237. Different users could have different dip switch setting to reduce interference between systems.

In order for controller 205 to be able to display when the phone is ringing the controller has a dual jack phone interface. Phone interface allows a phone to be connected to controller and the controller connected to a phone jack. Controller 205 senses the phone ringing and alerts the user to the ringing phone. While the preferred phone device is a standard telephone is should be apparent that the controller 205 works with a video phone to alert a user that the video phone is ringing. Additionally the controller 205 is able to ring the coupled phone to alert the users to changed conditions of the sensors. Controller 205 also has a standard telephone line that keeps the standard phone working in addition to the phone for the hearing impaired. Standard telephone line would allow those without hearing impairments to hear the ringing phone.

Light 221 is used by the controller 205 to indicate to the user that the condition of something that the controller 205 is monitoring has changed condition. Preferably the light 221 changes from un-illuminated to illuminated when the controller senses the change in conditions such as motion at a door, a ringing phone, or smoke alarm going off. Once the light 221 is illuminated the user can see from display 215 what the controller 205 is sensing. Light 221 functions as a night light to allow the users to see around the controller 205. Similar to the light, a bed shaker electrical coupled to the controller 205 provides tactile sensation to the user to alert them. Typically, bed shaker vibrates for a short amount of time and then turn off automatically. Having a combination of illuminated alerts, tactile alerts, and audible alerts provides alerting capabilities to those users who suffer with multisensory impairment, for example those individuals with both reduced eyesight and reduced hearing.

Input devices 237 allow a user to adjust the conditions of the controller. Input devices are typically momentary switches however flip switches are also used to set residual settings. When the controller 205 is not alerting a user to a changed condition the controller could act as a clock and have a digital clock on display 215. Input device 237 allows the user to set the time, timer, and time based alarms. One use of the input devices 237 forces the controller 205 to generate test alerts to all signaling devices so that the user can be assured that light bulbs have not burned out and speakers are set to appropriate high levels of volume.

Figure 3:
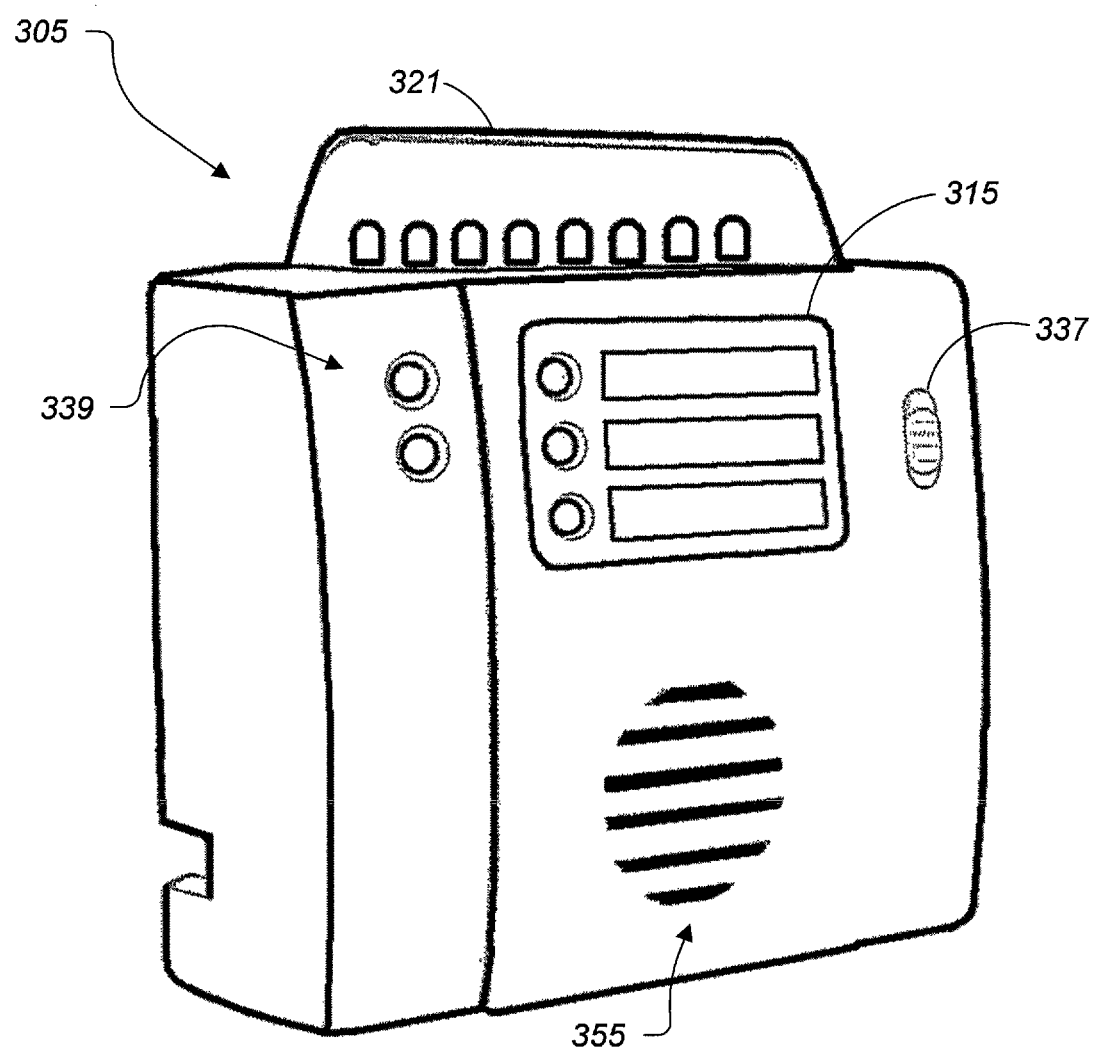
FIG. 3 is a perspective view of an alternative embodiment of a controller according to the present application.

Referring now also to FIG. 3 in the drawings, an alternative embodiment of a controller 305 according to the present application is illustrated. Controller 305 is similar to controller 205 in that controller has a display system 315, light system 321, input device 337, indicators 339, and a speaker 355. Controller 305 also called a multisensory device or a multisensory alert device produces a variety of alerts for those individuals that have difficulties sensing standard alerts. For example those users with sensory neural integration issues can process the flashing lights, the high decibel sounding alarm, and/or the tactile motion of the shaker depending upon the user's conditions. Whereas controller 205 is typically a convenience device suitable for a bedside to alert users to a knocking door or a phone call, controller 305 is an emergency alerting device designed to provide users with critical alerts. Speaker 355 emits a loud alarm of greater than one hundred and twenty decibels.

Controller 305 is a more emergency dedicated unit than controller 205, controller 305 preferably plugs into a standard wall outlet for power however controller 305 also has a local power supply such as batteries to enable controller 305 to operate if the preferred power source fails. In the preferred embodiment controller 305 does recharge the batteries located inside the controller 305 however it should be apparent that other embodiments include the controller 305 not recharging the internal batteries.

Display 315 displays messages to the user related to the conditions of the sensors. For example if the sensor that registers someone was at the door indicated that the there was movement at the door, the display 315 would indicate the light next to the word "DOOR" across the display 315 to allow the user to know that there was likely someone at the door. Alternatively, the display 315 would indicate the light next to the word "TELE" to indicate that the phone was ringing. In the preferred embodiment the display is an array of light emitting diodes "LED". Illuminators 339 are typically a row of LED's to alert the user to the conditions of the sensors, controller 305, and signaling devices. While LED's are the preferred indicator it should be apparent that other devices such as light bulbs could be used to indicate the conditions of the system. In alternative embodiments the display 315 indicates: "BABY" in response to a signal from a paired baby sensor; "PANIC" in response to a signal from a paired waterproof panic alarm; "WATER" in response to a signal from a paired water sensor; or "CH1" "CH2" from those devices that may be reconfigured with an identifiable name. An important aspect of controller 305 is the emergency nature of the controller. While controller 205 is configured for convenience or environmental use, controller 305 is designed for emergency notification. Controller 305 typically monitors fewer sensors than controller 205. Controller 305 is configured such that a sensor can be connected directly to a fire alarm system. The connection to fire alarm system in the preferred embodiment would be acoustically connected, for example the fire alarm system generates an audible fire alarm sound that the sensor picks up and relays to the controller 305. In an alternative embodiment the connection is electrical, for example the fire alarm generates a voltage in response to a fire alarm that the sensor can measure and therefore alert the user that a fire alarm is sounding. This allows the controller 305 to monitor for fire alarms that typically would generate audible fire alarms. Therefore the controller can flash a light and shake the bed in response to the close circuit fire alarm alert and or to the audible fire alarm.

Light 321 is used by the controller 305 to indicate to the user that the condition of something that the controller 305 is monitoring has changed condition. Preferably the light 321 changes from un-illuminated to illuminated when the controller senses the change in conditions such as a smoke alarm going off. Once the light 321 is illuminated the user can see from display 315 what the controller 305 is sensing. Light 321 is capable of blinking in a variety of patterns to indicate conditional information. Light 321 is for providing a high intensity emergency visual alert to the user. Typically, the light output from the light 321 is greater than one hundred and seventy seven candelas.

Input device 337 allows a user to adjust the conditions of the controller 305. Input device 337 is typically momentary switch however flip switches are also used to set residual settings. Additional switches can be used to set conditions of the controller 305 in addition to the input device 337. Typically, the controller 305 is paired with the sensors by depressing a pairing button on both the controller 305 and the sensor such that they electronically recognize each other.

In order for controller 305 to be used in conjunction with a bed shaker, the bed shaker would have its own controller. Configuring the bed shaker to be a controller allows the bed shaker to receive alerts from sensors without controller 305. This also increases reliability in case the controller 305 doesn't function, the bed shaker would still provide tactile alerts in cases of emergency. The separate bed shaker continues to vibrate continuously until reset at the bed shaker controller. Therefore if a fire burns up the sensor and fire alarm while the user is asleep, the vibrating pad of the bed shaker would continue to try and wake up the user until reset by the user.

Figure 4:
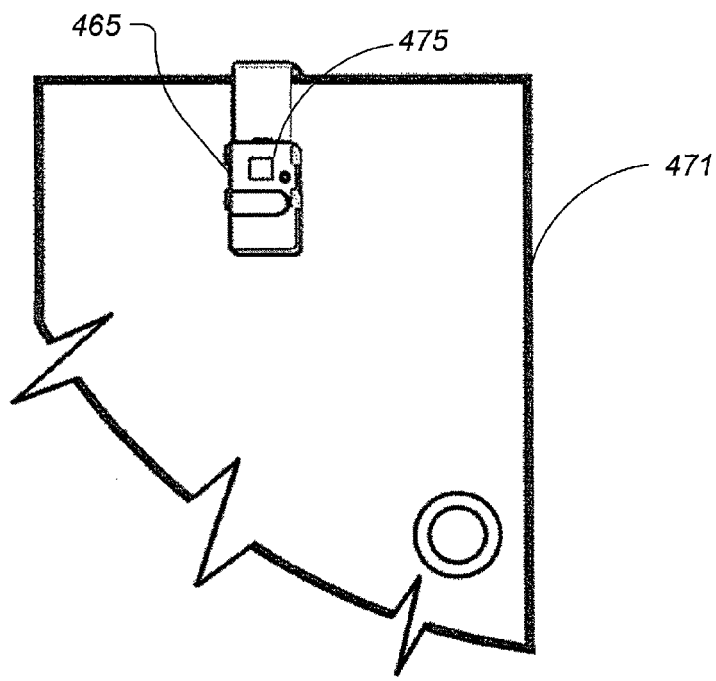
FIG. 4 is a perspective view of the preferred embodiment of a door sensor according to the present application.

Referring now also to FIG. 4 in the drawings, a preferred embodiment of a door sensor 465 according to the present application is illustrated. Door sensor 465 is mounted to the door 471. Typically the door sensor 465 picks up motion from the door such as someone knocking on it and relays that information to controller 205. This is useful because those users that are hearing impaired would not likely hear someone banging or even knocking on the door 471. Preferably door sensor 465 uses a microphone to pick up the vibrations of the door knocking. Filtering the microphone so to limit the amount of vibrations the door sensor 465 picks up is typical. Alternative methods for door sensor 465 to pick up the vibrations include accelerometers, strain gages, potentiometers, and piezo-electric material. It should be apparent that door sensor 465 while typically inside a home could be located outside such that a visitor could press a button 475 to indicate someone was at the door. The interface between the door sensor 465 and the controller 205 is preferably wireless. So that interference with other systems can be reduced, the door sensor 465 preferably has several wireless channels that can be used by the door sensor 465 in communications with the controller 205. Door sensor 465 provides controller 205 with the status of the door knocking, as well as, the condition of the battery that the door sensor 465 relies on. Door sensor 465 is able to register a door knock and a doorbell. Alternatively, door sensor 465 could function as a door bell and allow someone to depress a button on the door sensor 465 to alert the controller 205. Controller 205 is able to receive a test message from the door sensor 465 to test the communications and insure the door sensor 465 is operating properly. The test message is important so that users do not have to constantly test the door sensor 465 to insure that knocking on the door is registered by the controller 205.

Figure 5:
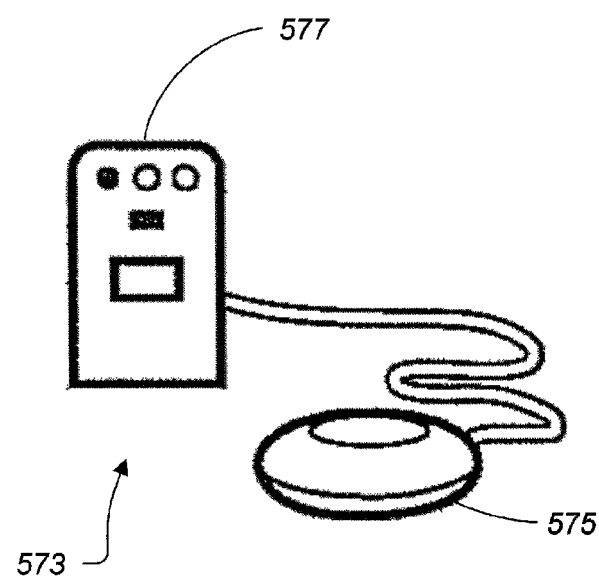
FIG. 5 is a perspective view of an alternate embodiment of a bed shaker according to the present application.

Referring now also to FIG. 5 in the drawings, a preferred embodiment of a bed shaker 573 according to the present application is illustrated. Bed shaker 573 includes a shaker puck 575 and a shaker receiver 577. Shaker puck 575 generates vibrations in response to signals from the shaker receiver 577. Shaker puck 575 typically is located adjacent to a bed mattress such that when the shaker puck 575 vibrates a user on the bed would feel the vibrations emanate from the shaker puck 575 and be alerted to an alert from the controller 205. Bed shaker 573 is in communication from the controller 205 by shaker receiver 577. Typically bed shaker 573 is wired directly to controller for both power and communications. A local power supply such as a battery may be located in the shaker receiver 577 so that if power from the controller is lost the bed shaker 573 can still function. Controller 205 is able to send a test message to bed shaker 573 to test the communications and insure the bed shaker 573 is operating properly. The test message is important so that users do not have to constantly test the bed shaker 573 to insure that the controller 205 can move the bed shaker 573. Bed shaker 573 uses various patterns of shaking to indicate different alerts to the user. The preferred pattern of shaking is a constant continuous shaking so long as the alert is present that can only be stopped by resetting the controller 205. Bed shaker 573 has a thermal fuse to prevent the bed shaker 573 from overheating in those instances where the bed shaking is not stopped by resetting the controller. In an alternative embodiment the bed shaker 573 operates as a controller thereby directly receiving signals from the paired sensors. Therefore the bed shaker 573 would have a rest button allowing the user to stop the bed shaking.

An alternative embodiment of bed shaker 573 includes the ability of the user to adjust the duration, intensity, and the pattern of the vibration. Furthermore, the user is able to program the bed shaker 573 with a specific pattern in response to a specific alert. For example, the user would typically set the shaker to max intensity, duration, and an abrupt on-off pattern repeating indefinitely for a fire alarm. The user would then reduce the intensity and duration and make the pattern less abrupt for alerting them that a visitor was at a door knocking. Additionally, the system is able to pattern vibratory patterns based upon musical notes or other patterns. For example, the system can convert a digital music file from an audible form into a sensory form. This process converts the frequencies of the audible file from their high frequencies, such as 500 Hz-20,000, into low frequencies, such as 1-500 Hz. Therefore, the user can feel the pattern of the song as opposed to hear it. Additionally, the system is able to utilize a feedback loop to determine how best to wake a user based upon their sleep cycle. The system utilizes a variety of sensors to measure the sleep pattern of the user. Typically, the system measures the user's restlessness with motion sensors, potentiometers, accelerometers, strain gages, and the temperature of the user with thermocouples. This also provides the system with the ability to check if the user if awakening in response to the vibrations. The system can modify the vibrations intensity to awaken the user if a lower setting doesn't appear to be working after a period of time. Typically, the system is programmed via a smartphone or tablet by way of a computer based software application.

Figure 6:
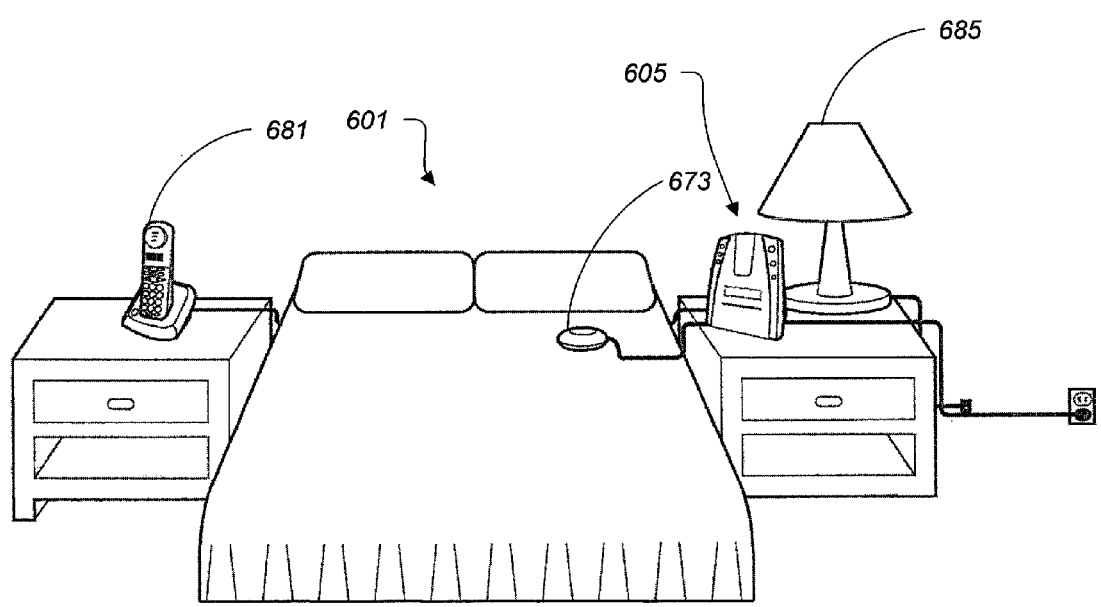
FIG. 6 is a perspective view of an alternate embodiment of as alarm monitoring system according to the present application.

Referring now also to FIG. 6 in the drawings, an alternative embodiment of an alarm monitoring system 601 according to the present application is illustrated. Alarm monitoring system 601 includes a controller 605, a panic button or switch, a door sensor, an alarm sensor, a baby monitor, a bed shaker 673, a telephone 681, and a lamp 685. The lamp 658 preferably is electrically coupled to the controller 605 by a relay. The relay allows the controller 605 to turn on and off the lamp 658 in response to changing conditions of the sensors.

Typically the controller 605 of the alarm monitoring system 601 monitors and/or constantly checks the condition of the door sensor, the alarm sensor, and the telephone. As the conditions of the door sensor, the alarm sensor, and the telephone vary the controller 605 indicates to the user that conditions have changed. For example as a visitor approaches the door and knocks on it the door sensor sends a signal to the controller 605. Controller 605 then flashes the integrated light, flashes the bed lamp 685, activates the bed shaker 673, and indicates the message "DOOR" on the display. Controller 605 registers that the fire alarm has been activated by the alarm sensor located adjacent to the fire alarm. Depending how the DIP switches of controller 605 are set, allows the controller 605 to flash the integrated light, flash the bed lamp 685, activate the bed shaker 673, and reveal the message "FIRE" on the display of the controller. Fire sensor typically is physically coupled to the existing fire alarms but is not electrical connected. It should be apparent that fire sensor could be integrated directly into fire alarms thereby preventing the need to retrofit fire alarms with alarm sensors. The user would see the flashing lights or feel the vibrations and be alerted to the controller 605 to see what the message is. Controller 605 monitors a panic button worn by a user. Panic button would allow the controller 605 to indicate "PANIC" for example if an elderly spouse fell in the garage and depressed the panic switch. A hearing impaired user might not hear the yelling from the fallen spouse but could see the flashing lights and such from the controller 605.

Controller 605 is able to be coupled to a weather alert radio. Typically, if the weather alert radio generates an alarm tone the sensor picks up the alarm tone and relays the alert to the controller 605. The controller 605 then alerts the user that the weather alert has been sounded. In this embodiment, sensor is electrical coupled to the headphone plug of the weather radio and picks up electrical changes resulting from the weather radio alert. It is also contemplated that the sensor could listen for the tone by being in close proximity to the weather radio's speaker. Similarly controller 605 is capable of being configured to monitor for alerts from devices that generate audio signals either from speaker or headphone plugs. Typically these devices include cell phones, baby monitors, tablets, computers, video phones, alarm clocks, doorbells, and high water alarms. Sensor measures the electrical output of the headphone plug of the device and relays the alert to the controller 605 if the device starts generating a tone from the headphone plug.

In an alternative embodiment the controller 605 is in wireless communication with a tactile pager worn by the user that may be located outside the vicinity of the controller 605 and not see the flashing lights or feel the vibrations. The pager has a display similar to that of the controller 605 and indicates messages to the user in the same way. Such the when the door sensor is activated the pager would indicate the word "DOOR". The pager has a high decibel speaker along with a vibration generator to aid in alerting the user. In an alternative embodiment the tactile pager could be a controller and receive signals directly from the sensors. In those embodiments where the pager is the controller the pager is configured to receive two different sensors. For example the door sensor could be channel 1 and the fire alarm could be channel 2.

For some users that do not require a display or want a large housing for the controller 605, the controller 605 is packaged in a housing that would forgo the integral lights and the display and allow the controller 605 to controller the power to an electrical coupled lamp. Typically, the user would understand that if the lamp is flashing in a predetermined pattern that a particular sensor is being activated such as some one at the door.

While the preferred embodiment of the controller 605 is in the form of a clock it should be apparent that the form of the controller 605 in an alternative embodiment is a tablet or smart phone in communications with a base station. Base station would contain the interfaces between the sensors and the signaling devices along with integral lighting. Phone plugs and network plugs allow the base station to signal the user, along with allowing base station to communicate with other devices. Communications between the base station and the tablet would be a combination of wired and wireless depending on the location of the tablet relative to the base station. Because the screen of the tablet would be touch sensitive it would reduce the number of buttons on the controller. Furthermore, the functionality and the layout of the display can be reprogrammed easier than reconfiguring buttons and LED's. Because of the critical nature of displaying information to the user some instances of the display feature Eink display because of the high contrast for ease of viewing from a wide variety of viewing angles.

Having the controller take the form of a tablet and base station would allow the user to easily move the tablet around the home or business and remain aware of the conditions of the sensors. The tablet is in communications with computers, phones, pagers so that alerts that would normally be seen only by a local user could be relayed to a remote user such as a relative located a few miles away. Preferably the user is able to provide permission to remote users to be alerted to the sensors of the user's house. For example if the fire sensor was triggered by a fire alarm the controller flashes the attached lamps, and sends a text messages to a pre-programmed list of concerned users. There are other ways of tablet communicating with the user and others that the user has selected to receive information from the tablet. For example, the tablet can send an emergency message comprised of audio, video, and textual information related to the emergency. The emergency message could be broadcast to multiple units across an enterprise such as a hospital, hotel, school, or jail. Allowing the tablet to send information to others, allows a user the freedom to live alone knowing that someone is around to watch over them in case of an emergency. Alternate embodiments of controller include a smartphone, a smart watch, a smart television, and a smart appliance. The alternate embodiments of controllers need to be able to interface with sensors, provide alerts to those with sensory loss, and allow users to control how the alerts are provided.

It is apparent that an assembly with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A system for alerting those with hearing impairments, the system comprising:
   sensors for measuring specific conditions that those with hearing impairments cannot readily discern;
   signaling devices for alerting those with hearing impairments to specific conditions measured by the sensors; and
   a controller, comprising;
      a display configured for providing conditional information related to the sensors;
      a first light; and
      a telephone system located in the controller, the telephone system having;
         a first telephone port, configured to indicate to the controller that a coupled phone for the hearing impaired is ringing;
         a second telephone port, configured for allowing those without hearing impairments to answer a standard coupled phone wired to the second telephone port; and
         a third telephone port, configured for connecting the telephone system to a public phone system;
      wherein the sensors are wirelessly connected to the controller.

2. The system according to claim 1, wherein the sensors comprise:
   a door sensor having;
      a button; and
      a microphone configured for measuring vibrations;
   a fire alarm sensor; and
   a panic switch configured for controlling the first light;
   wherein the door sensor is external to a door being monitored.

3. The system according to claim 2, wherein the sensors further comprise:
   a headphone sensor;
   wherein the headphone sensor is configured for detecting changes outputted by a headphone jack and alerting the controller to the detected changes thereby alerting those with hearing impairments.

4. The system according to claim 1, further comprising:
   a second light external to the controller, the second light configured for alerting the user to changes in the specific conditions of the sensors;
   a relay configured to allow the controller to control power to the second light.

5. The system according to claim 1, wherein the signaling devices comprises:
   a bed shaker;
   wherein the bed shaker is electrically coupled to the controller; and
   wherein the controller causes the bed shaker to produce vibrations so long as the sensors are activated.

6. The system according to claim 1, further comprising:
   an alarm clock; and
   a radio.

7. An alarm monitoring system for relaying information to a user, comprising:
   a plurality of sensors configured for detecting conditions not readily detectable by the user, the plurality of sensors comprising:
      a wireless door sensor having;
         a microphone configured for sensing knocking; and
         a button located on the wireless door sensor;
   a plurality of indicators configured to display information to the user;
   a controller configured to monitor the plurality of sensors for changes in conditions and alert the user to the changes in conditions by signaling the plurality of indicators; and
   a headphone sensor coupled to a headphone jack;
   wherein the headphone sensor is configured for detecting changes outputted by the headphone jack and alerting the controller to the detected changes thereby alerting the user;
   wherein the headphone sensor measures an electrical output of the headphone jack;
   wherein the user has a hearing impairment thereby preventing the user from hearing audible alarms; and
   wherein the button on the wireless door sensor alerts the controller when depressed.

8. The alarm monitoring system according to claim 7, wherein the plurality of sensors further comprises:

a wireless fire alarm sensor configured for acoustically sensing an audible fire alarm;

wherein the wireless door sensor provides the controller a battery level of the wireless door sensor; and wherein the wireless fire alarm sensor provides the controller a battery level of the wireless fire alarm sensor.

9. The alarm monitoring system according to claim 8, wherein the plurality of sensors further comprises:

a wireless panic switch configured to be carried by the user;

wherein the wireless panic switch provides the controller a battery level of the wireless panic switch; and wherein the controller provides the user a warning related to the battery level being low.

10. The alarm monitoring system according to claim 7, wherein the plurality of indicators comprises:

a display;

a bed shaker directly coupled to the controller; and a light;

wherein the controller activates the bed shaker in response to predetermined conditional changes in the plurality of sensors; and wherein the bed shaker continuously vibrates until the user resets the bed shaker at the controller.

11. The alarm monitoring system according to claim 10, wherein the display is configured for allowing the user to provide input into the controller by touching the display with a finger.

12. The alarm monitoring system according to claim 7, further comprising:

a first telephone jack, and a second telephone jack;

wherein the first telephone jack is configured for allowing those without hearing impairments to answer a standard coupled phone;

wherein the second telephone jack is configured for connecting the controller to a public phone system; and wherein the controller is configured for alerting the user to a ringing phone by the plurality of indicators.

* * * * *